United States Patent
Salter et al.

(10) Patent No.: US 9,776,557 B2
(45) Date of Patent: Oct. 3, 2017

(54) DUAL DIRECTION LIGHT PRODUCING ASSEMBLY

(71) Applicant: Ford Global Technologies, LLC, Dearborn, MI (US)

(72) Inventors: Stuart C. Salter, White Lake, MI (US); James J. Surman, Clinton Township, MI (US); Paul Kenneth Dellock, Northville, MI (US); Gregory James Grudzinski, Perrysburg, OH (US)

(73) Assignee: Ford Global Technologies, LLC, Dearborn ( * ) Notice: Subject to any disclaimer, the term of this patent is extended or adjusted under 35 U.S.C. 154(b) by 55 days.

(21) Appl. No.: 14/829,006

(22) Filed: Aug. 18, 2015

(65) Prior Publication Data

US 2015/0353003 A1    Dec. 10, 2015

Related U.S. Application Data

(63) Continuation-in-part of application No. 14/603,636, filed on Jan. 23, 2015, which is a continuation-in-part of application No. 14/086,442, filed on Nov. 21, 2013.

(51) Int. Cl.
| | |
|---|---|
| *F21V 11/00* | (2015.01) |
| *B60Q 1/26* | (2006.01) |
| *F21S 8/10* | (2006.01) |
| *H05B 37/02* | (2006.01) |
| *B60Q 9/00* | (2006.01) |
| *B60Q 3/68* | (2017.01) |

(Continued)

(52) U.S. Cl.
CPC .............. *B60Q 1/268* (2013.01); *B60Q 3/208* (2017.02); *B60Q 3/68* (2017.02); *B60Q 3/80* (2017.02); *B60Q 9/008* (2013.01); *F21S 48/212* (2013.01); *F21S 48/214* (2013.01); *F21S 48/215* (2013.01); *H05B 37/0218* (2013.01); *H05B 37/0227* (2013.01); *F21Y 2115/10* (2016.08); *Y02B 20/46* (2013.01)

(58) Field of Classification Search
CPC ........ B60Q 1/268; B60Q 9/008; B60Q 3/008; B60Q 3/0293; B60Q 3/0213; F21K 9/64; F21S 48/214; F21S 48/212; F21S 48/215; H05B 37/0218; H05B 37/0227; F21Y 2101/00; Y02B 20/46

See application file for complete search history.

(56) References Cited

U.S. PATENT DOCUMENTS

| | | | |
|---|---|---|---|
| 6,729,738 B2 | 5/2004 | Fuwausa et al. | |
| 6,773,129 B2 | 8/2004 | Anderson, Jr. et al. | |

(Continued)

FOREIGN PATENT DOCUMENTS

| | | |
|---|---|---|
| CN | 201169230 Y | 2/2009 |
| CN | 201193011 Y | 2/2009 |

(Continued)

*Primary Examiner* — Alexander Garlen
(74) *Attorney, Agent, or Firm* — Jason Rogers; Price Heneveld LLP

(57) ABSTRACT

A light-producing assembly is provided herein and includes a first portion of LEDs biased to direct light in a first direction, a second portion of LEDs biased to direct light in a second direction that is different than the first direction, and a controller for selectively activating the first and/or second portions of LEDs.

14 Claims, 5 Drawing Sheets

(51) Int. Cl.
  *B60Q 3/208* (2017.01)
  *B60Q 3/80* (2017.01)
  *F21Y 115/10* (2016.01)

(56) References Cited

U.S. PATENT DOCUMENTS

| | | |
|---|---|---|
| 6,871,986 B2 | 3/2005 | Yamanaka et al. |
| 6,990,922 B2 | 1/2006 | Ichikawa et al. |
| 7,213,923 B2 | 5/2007 | Liu et al. |
| 7,264,366 B2 | 9/2007 | Hulse |
| 7,264,367 B2 | 9/2007 | Hulse |
| 7,753,541 B2 | 7/2010 | Chen et al. |
| 7,834,548 B2 | 11/2010 | Jousse et al. |
| 8,016,465 B2 | 9/2011 | Egerer et al. |
| 8,203,260 B2 | 6/2012 | Li et al. |
| 8,408,766 B2 | 4/2013 | Wilson et al. |
| 8,466,438 B2 | 6/2013 | Lambert et al. |
| 8,519,362 B2 | 8/2013 | Labrot et al. |
| 8,606,430 B2 | 12/2013 | Seder et al. |
| 8,724,054 B2 | 5/2014 | Jones |
| 8,773,012 B2 | 7/2014 | Ryu et al. |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2009/0114928 A1* | 5/2009 | Messere ........ B32B 17/10 257/88 |
| 2009/0219730 A1 | 9/2009 | Syfert et al. |
| 2009/0243822 A1* | 10/2009 | Hinninger ....... B60Q 9/008 340/435 |
| 2011/0180818 A1* | 7/2011 | Lerman ........ H01L 25/0753 257/88 |
| 2012/0001406 A1 | 1/2012 | Paxton et al. |
| 2013/0026504 A1* | 1/2013 | Marx ............... F21K 9/00 257/88 |
| 2013/0335994 A1 | 12/2013 | Mulder et al. |
| 2014/0209945 A1* | 7/2014 | Baldridge ...... H01L 25/0753 257/91 |
| 2014/0266666 A1 | 9/2014 | Habibi |

FOREIGN PATENT DOCUMENTS

| | | |
|---|---|---|
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| WO | 2006047306 A1 | 5/2006 |
| WO | 2014068440 A1 | 5/2014 |

* cited by examiner

DUAL DIRECTION LIGHT PRODUCING ASSEMBLY

CROSS-REFERENCE TO THE RELATED APPLICATIONS

This application is a continuation-in-part of U.S. patent application Ser. No. 14/603,636, filed Jan. 23, 2015, entitled "DOOR ILLUMINATION AND WARNING SYSTEM," which is a continuation-in-part of U.S. patent application Ser. No. 14/086,442, filed Nov. 21, 2013, entitled "VEHICLE LIGHTING SYSTEM WITH PHOTOLUMINESCENT STRUCTURE." The aforementioned related applications are hereby incorporated by reference in their entirety.

FIELD OF THE INVENTION

The present invention generally relates to vehicle lighting systems and more particularly relates to vehicle lighting systems employing photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present invention, a light-producing assembly is provided and includes a first portion of LEDs biased to direct light in a first direction and a second portion of LEDs biased to direct light in a second direction that is different than the first direction. A photoluminescent structure is configured to luminesce in response to excitation by light emitted by one of the first and second portion of LEDs. A controller selectively activates the first and/or second portions of LEDs.

According to another aspect of the present invention, a light-producing assembly is provided and includes a first portion of LEDs biased to direct light in a first direction, a second portion of LEDs biased to direct light in a second direction that is different than the first direction, and a controller for selectively activating the first and/or second portions of LEDs.

According to yet another aspect of the present invention, a window assembly of a vehicle is provided. A light-producing assembly is coupled to a vehicle window and includes a first portion of LEDs biased to direct light in an outward-vehicle direction and a second portion of LEDs biased to direct light in an inward-vehicle direction. A controller selectively activates the first and/or second portions of LEDs.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein.

However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure is related to a window assembly of a vehicle. The window assembly is operable to reduce visibility through a window of the vehicle to provide a vehicle occupant(s) with privacy from onlookers located outside the vehicle. While the window assembly is contemplated for use in automobiles, it should be appreciated that the window assembly provided herein may be similarly used in other types of vehicles designed to transport one or more passengers such as, but not limited to, aircraft, watercraft, and locomotives.

Figure 1:
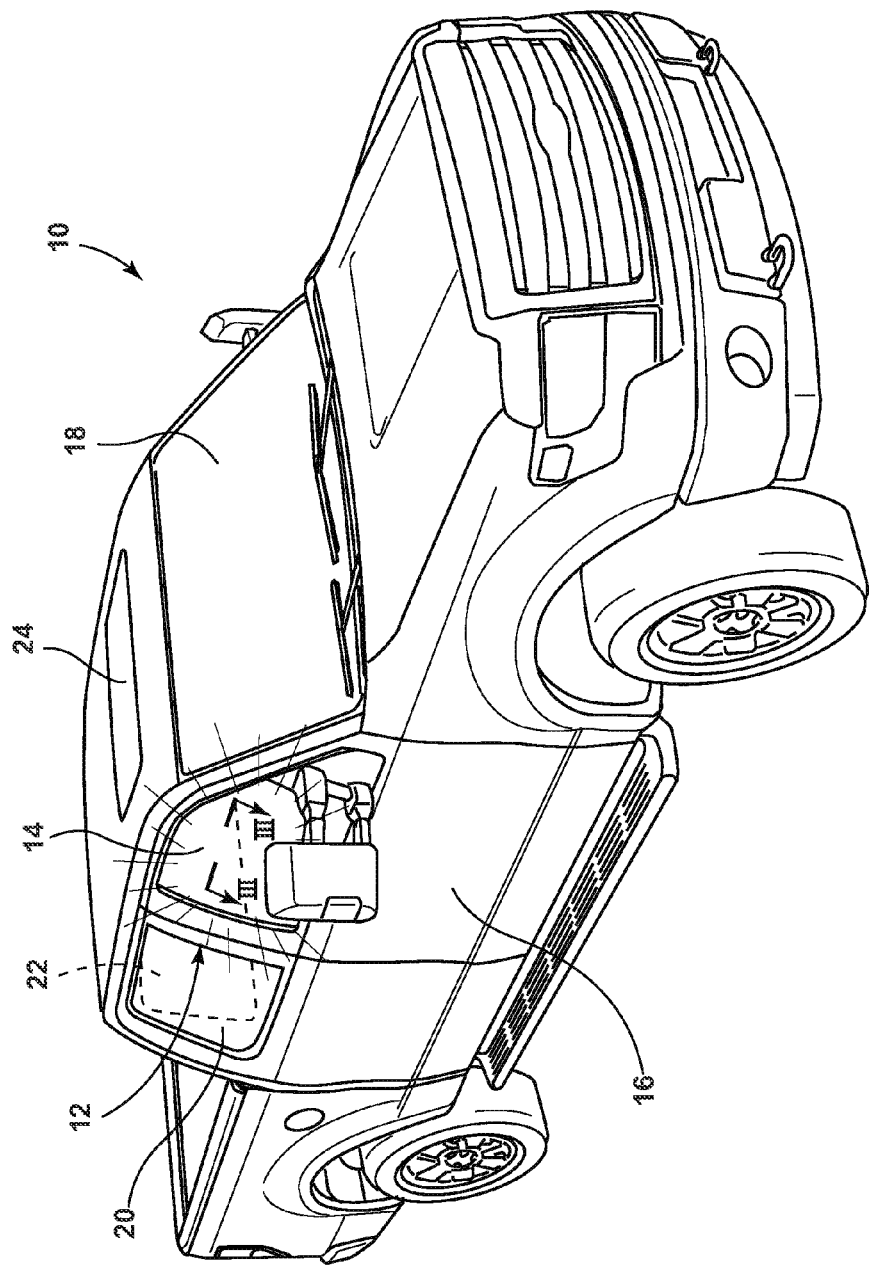
FIG. 1 illustrates a side perspective view of a vehicle equipped with a window assembly, according to one embodiment.

Referring to FIG. 1, a vehicle 10 is generally shown having a window assembly 12, according to one embodiment. The window assembly 12 may include a window of the vehicle 10, exemplarily shown as side window 14 mounted to door 16. In operation, at least a portion of the side window 14 may produce illumination directed in an outward-vehicle direction, as demonstrated by the lines extending from the side window 14. As will be described herein, the illumination originates from a light-producing assembly coupled to the side window 14 and it is contemplated that the light producing assembly may be operated to effectuate a variety of lighting applications. While the light-producing assembly will be described herein in relation to side window 14, it should be appreciated that other windows of the vehicle 10, such as front windshield 18, side window 20, rear windshield 22, and/or roof window 24 (e.g., moonroof/sunroof) may be similarly configured to illuminate according to any of the embodiments described herein.

Figure 2:
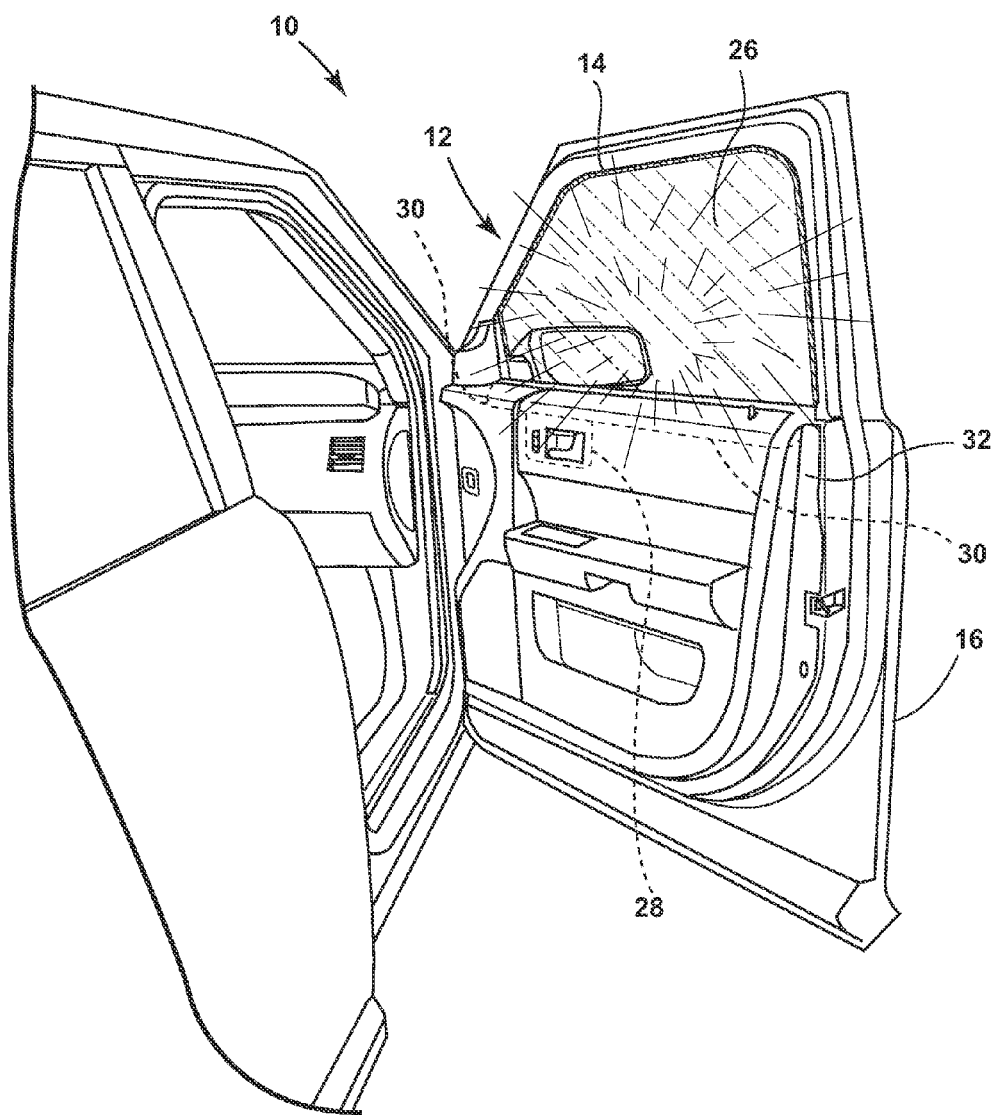
FIG. 2 illustrates a perspective view of a door of the vehicle depicted in FIG. 1 arranged in an open position, above which a light-producing assembly is shown coupled to a window, according to one embodiment.

Referring to FIG. 2, door 16 is shown in an open position. The window assembly 12 includes a light-producing assembly 26 that is coupled to the side window 14 of the vehicle 10 and is responsible for the illumination depicted in FIG. 1. The light-producing assembly 26 may be coupled to either side of the side window 14 or otherwise integrated therein. For purposes of understanding, a portion of the side window 14 is slightly shaded by broken lines to illustrate the area of the side window 14 that is covered by the light-producing assembly 26 according to one embodiment. However, it is to be understood that the light-producing assembly 26 is generally concealed when in a deactivated state so as not to obstruct the view of vehicle occupants. It is also to be understood that the light-producing assembly 26 may be configured in a variety of dimensions such that it occupies a substantial entirety of the side window 14 or a portion thereof.

Referring still to FIG. 2, the light-producing assembly 26 may also produce illumination that is directed in an inward-vehicle direction when the door 16 is in a closed position. The light-producing assembly 26 is electronically connected to a controller 28 via conductive leads 30, which may be wired through a door frame 32 of the door 16. The controller 28 may be positioned within the door frame 32 or in other areas of the vehicle 10 and is electrically connected to a power source (not shown), which may include a vehicle power source or alternative power source.

Figure 3:
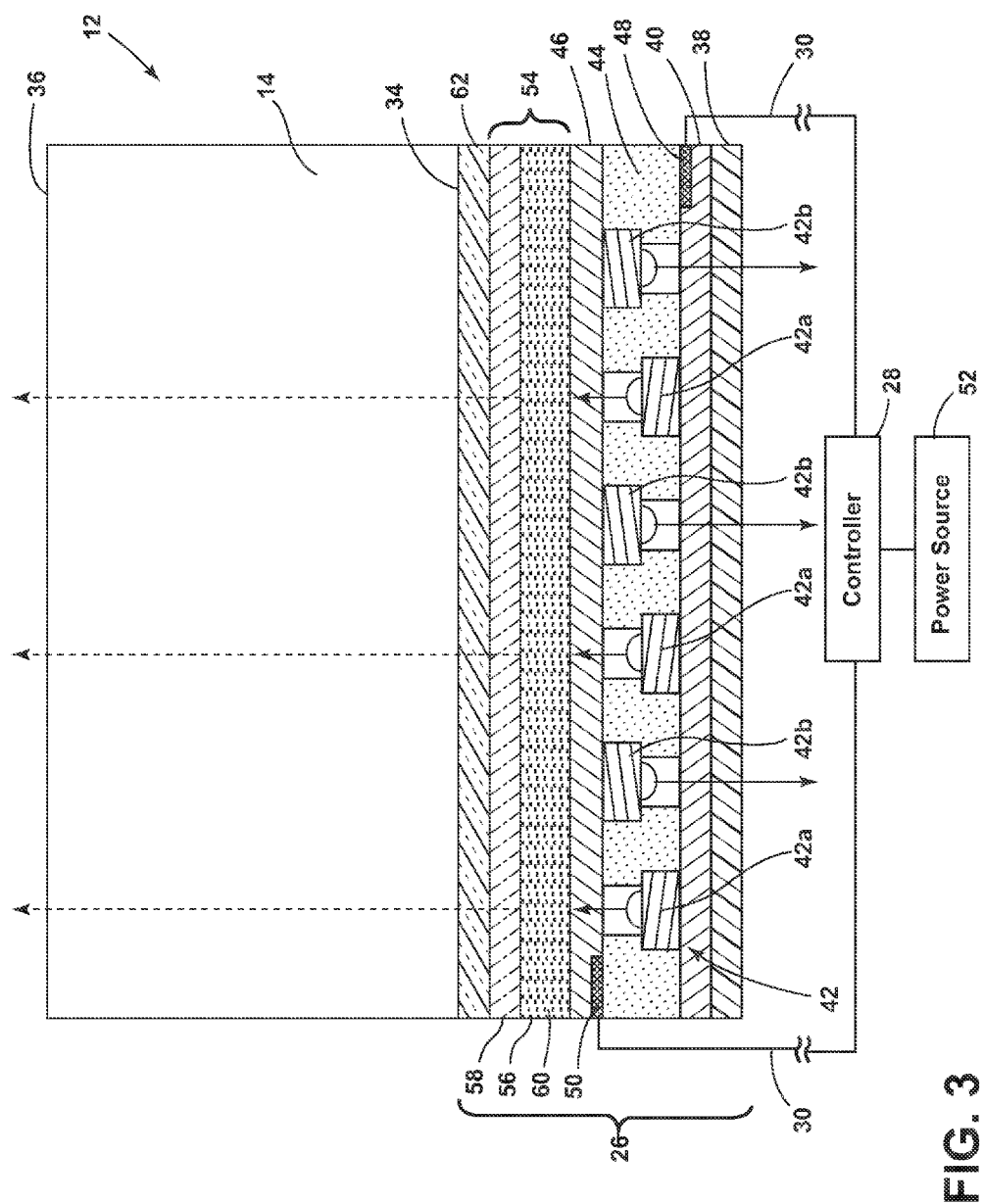
FIG. 3 is a cross-sectional view of the window assembly depicted in FIGS. 1 and 2 taken along line III-III of FIG. 1.

Referring to FIG. 3, a cross-sectional view of the window assembly 12 depicted in FIGS. 1 and 2 is shown according to one embodiment, in which the light-producing assembly 26 is coupled the side window 14 at window portion 34, which faces toward interior of the vehicle 10. In another embodiment, the light-producing assembly 26 may be coupled to the side window 14 at window portion 36, which faces toward the exterior of the vehicle 10. In yet another embodiment, the light-producing assembly 26 may be integrated with the side window 14 and positioned between window portions 34 and 36. However, by coupling the light-producing assembly 26 to window portion 34 of the side window 14, the light-producing assembly 26 is not in direct contact with the external environment. While the light-producing assembly 26 is shown in a planar configuration, it should be appreciated that non-planar configurations are possible in instances where it is desired to couple the light-producing assembly 26 to a curved window portion.

With respect to the illustrated embodiment, the light-producing assembly 26 includes a substrate 38, which may include a substantially transparent polycarbonate, polymethyl methacrylate (PMMA), or polyethylene terephthalate (PET) material on the order of 0.005 to 0.060 inches thick. A positive electrode 40 is arranged over the substrate 38 and includes a substantially transparent conductive material such as, but not limited to, indium tin oxide. The positive electrode 40 is electrically connected to a printed light emitting diode (LED) arrangement 42 that is arranged within a semiconductor ink 44 and applied over the positive electrode 40. Likewise, a substantially transparent negative electrode 46 is also electrically connected to the printed LED arrangement 42. The negative electrode 46 is arranged over the semiconductor ink 44 and includes a transparent or translucent conductive material such as, but not limited to, indium tin oxide. In alternative embodiments, the positive and negative electrodes 40, 46 may swap positions within the light-producing assembly 26 if desired. Each of the positive and negative electrodes 40, 46 are electrically connected to a controller, such as controller 28 depicted in FIG. 2 via a corresponding bus bar 48, 50 connected to one of the conductive leads 30. The bus bars 48, 50 may be printed along opposite edges of the positive and negative electrodes 40, 46 and the points of connection between the bus bars 48, 50 and the conductive leads 30 may be at opposite corners of each bus bar 48, 50 to promote uniform current distribution along the bus bars 48, 50. The controller 28 may also be electrically connected to a power source 52, which may correspond to a vehicular power source operating at 12 to 16 VDC.

The printed LED arrangement 42 may be dispersed in a random or controlled fashion within the semiconductor ink 44. In the presently illustrated embodiment, the printed LED arrangement 42 includes a first portion of LEDs 42*a* biased to direct light in an outward-vehicle direction and a second portion of LEDs 42*b* biased to direct light in an inward-vehicle direction, assuming the door 16 is in a closed position. The LEDs 42*a*, 42*b* may correspond to micro-LEDs of gallium nitride elements on the order of 5 to 400 microns in size and the semiconductor ink 44 may include various binders and dielectric material including, but not limited to, one or more of gallium, indium, silicon carbide, phosphorous, and/or translucent polymeric binders. In this manner, the semiconductor ink 44 may contain various concentrations of LEDs 42*a*, 42*b* such that the density of the LEDs 42*a*, 42*b* may be adjusted for various lighting applications. Also, given their small sizing, a relatively high density of LEDs 42*a*, 42*b* may be used without obstructing the view of vehicle occupants when in a deactivated state. The semiconductor ink 44 can be applied through various printing processes, including ink jet and silk screen processes to selected portion(s) of the positive electrode 40. More specifically, it is envisioned that the LEDs 42*a*, 42*b* are dispersed within the semiconductor ink 44, and shaped and sized such that they align with the positive and negative electrodes 40, 46 during deposition of the semiconductor ink 44. The portion of the LEDs 42*a*, 42*b* that ultimately are electrically connected to the positive and negative electrodes 40, 46 may be selectively activated and deactivated by the controller 28. Additional information regarding the construction of light-producing assemblies is disclosed in U.S. Patent Publication No. 2014-0264396 A1 to Lowenthal et al., entitled "ULTRA-THIN PRINTED LED LAYER REMOVED FROM SUBSTRATE," filed Mar. 12, 2014, the entire disclosure of which is incorporated herein by reference.

Referring still to FIG. 3, the light-producing assembly 26 further includes a photoluminescent structure 54 arranged over the negative electrode 46 as a coating, layer, film or other suitable deposition. With respect to the presently illustrated embodiment, the photoluminescent structure 54 may be arranged as a multi-layered structure including an energy conversion layer 56 and an optional stability layer 58. The energy conversion layer 56 includes at least one photoluminescent material 60 having energy converting elements with phosphorescent or fluorescent properties. For example, the photoluminescent material 60 may include organic or inorganic fluorescent dyes including rylenes, xanthenes, porphyrins, phthalocyanines. Additionally or alternatively, the photoluminescent material 60 may include phosphors from the group of Ce-doped garnets such as YAG:Ce. The energy conversion layer 56 may be prepared by dispersing the photoluminescent material 60 in a polymer matrix to form a homogenous mixture using a variety of methods. Such methods may include preparing the energy conversion layer 56 from a formulation in a liquid carrier medium and coating the energy conversion layer 56 to the negative electrode 46 or other desired substrate. The energy conversion layer 56 may be applied to the negative electrode 46 by painting, screen printing, flexography, spraying, slot coating, dip coating, roller coating, and bar coating. Alternatively, the energy conversion layer 56 may be prepared by methods that do not use a liquid carrier medium. For example, the energy conversion layer 56 may be rendered by dispersing the photoluminescent material 60 into a solid state solution (homogenous mixture in a dry state) that may be incorporated in a polymer matrix formed by extrusion, injection, compression, calendaring, thermoforming, etc.

To protect the photoluminescent material 60 contained within the energy conversion layer 56 from photolytic and thermal degradation, the photoluminescent structure 54 may optionally include stability layer 58. The stability layer 58 may be configured as a separate layer optically coupled and adhered to the energy conversion layer 56 or otherwise integrated therewith. The stability layer 58 may be combined with the energy conversion layer 56 through sequential coating or printing of each layer, sequential lamination or embossing, or any other suitable means. The photoluminescent structure 54 may be coupled to window portion 34 via an adhesive layer 62 arranged over the photoluminescent structure 54.

Figure 4:
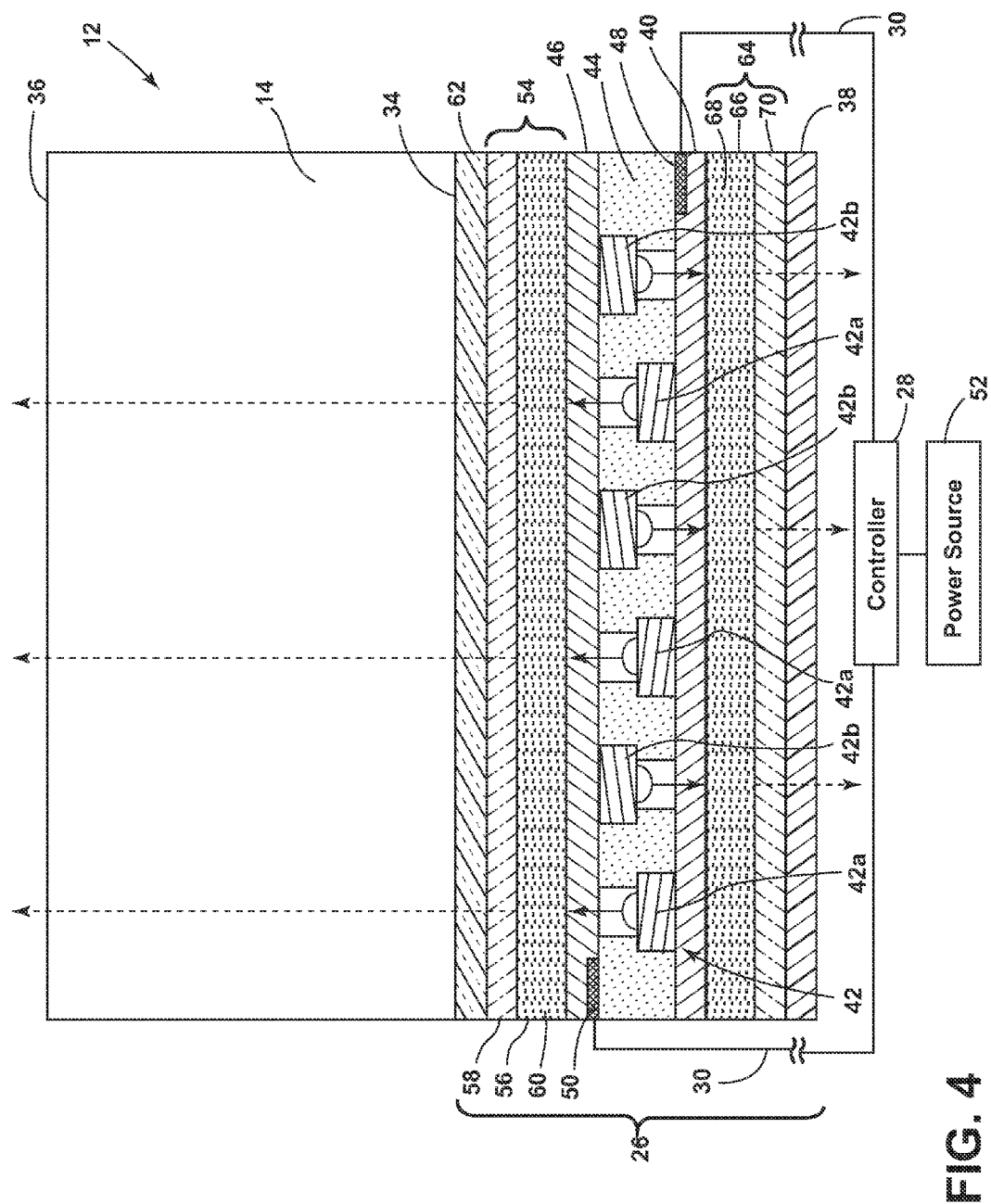
FIG. 4 is an alternative embodiment of the window assembly depicted in FIG. 3.

Referring to FIG. 4, the window assembly 12 is shown according to an alternative embodiment. The window assembly 12 is arranged in the same manner as that shown in FIG. 3, except an additional photoluminescent structure 64 is arranged between the substrate 38 and the positive electrode 40. The additional photoluminescent structure 64 may be similarly configured as photoluminescent structure 54 and includes an energy conversion layer 66 that includes at least one photoluminescent material 68 having energy converting elements with phosphorescent or fluorescent properties. The photoluminescent structure 64 may also optionally include a stability layer 70 as described herein. Additional information regarding the construction of photoluminescent structures is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Nov. 8, 2011, the entire disclosure of which is incorporated herein by reference.

According to one embodiment, the photoluminescent structures 54, 64 described herein are each configured to luminesce in response to light excitation. With respect to the window assembly 12 shown in FIG. 3, the photoluminescent structure 54 is excited by light emitted by the first portion of LEDs 42a. In response, the photoluminescent structure 54 luminesces, thereby producing the outward-vehicle illumination demonstrated in FIG. 1. In contrast, light emitted by the second portion of LEDs 42b is transmitted through the light-producing assembly 26 and directed in an inward-vehicle direction when the door 16 is in the closed position. With respect to the window assembly 12 shown in FIG. 4, the photoluminescent structure 54 functions in the same manner described above. However, with the inclusion of the additional photoluminsecent structure 64, light emitted by the second portion of LEDs 42b now serves as excitation light for causing the additional photoluminescent structure 64 to luminesce, thereby producing the inward-vehicle illumination described above.

In operation, excitation light emitted by the first and second portion of LEDs 42a, 42b undergoes an energy conversion where it's converted by the corresponding photoluminescent material 60, 68 and re-emitted therefrom at a different wavelength. Excitation light emitted by the first and second portion of LEDs 42a, 42b is referred to herein as inputted light and is illustrated in FIGS. 3 and 4 as solid arrows. In contrast, light emitted from the photoluminescent material 60, 68 is referred to herein as converted light and is illustrated in FIGS. 3 and 4 as broken arrows. According to one embodiment, the photoluminescent material 60, 68 may be formulated to convert inputted light into a longer wavelength light, otherwise known as down conversion. Alternatively, the photoluminescent material 60, 68 may be formulated to convert inputted light into a shorter wavelength light, otherwise known as up conversion. Under either approach, light converted by the photoluminescent material 60, 68 may be immediately outputted from the corresponding photoluminescent structure 54, 64 or otherwise used in an energy cascade, wherein the converted light serves as inputted light to excite another formulation of photoluminescent material located within the energy conversion layer 56, 66, whereby the subsequent converted light may then be outputted from the photoluminescent structure 54, 64 or used as inputted light, and so on. With respect to the energy conversion processes described herein, the difference in wavelength between the inputted light and the converted light is known as the Stokes shift and serves as the principle driving mechanism for an energy conversion process corresponding to a change in wavelength of light.

According to one embodiment, the photoluminescent material 60, 68 is formulated to have a Stokes shift resulting in the converted light having an emission spectrum expressed in a desired color, which may vary depending on the lighting application. For example, the energy conversion process may be undertaken by way of down conversion, whereby the inputted light includes light on the lower end of the visibility spectrum such as blue, violet, or ultraviolet (UV) light. Doing so enables blue, violet, or UV LEDs to be used as the LEDs 42a, 42b, which may offer a relative cost advantage over other colors of LEDs or simply using LEDs of the desired color and omitting the photoluminescent structure 54, 64 altogether.

In alternative embodiments, the energy conversion layer 56, 66 may include more than one distinct photoluminescent material, each configured to convert inputted light into a longer or shorter wavelength light. In one embodiment, the distinct photoluminescent materials may be interspersed within the energy conversion layer 56, 66. Alternatively, the distinct photoluminescent materials may be isolated from each other if desired. For example, the distinct photoluminescent materials may be arranged to alternate in a tessellation or other pattern. In either embodiment, each distinct photoluminescent material may be uniquely excited by a corresponding portion of the LEDs 42a, 42b, which may be variously arranged. In some embodiments, each distinct photoluminescent material may be formulated to have a Stokes shift resulting in the associated converted light having an emission spectrum expressed in a unique color such that the resultant luminescence corresponds to a light mixture of the converted light from each distinct photoluminescent material. By mixing the converted light outputted from two or more distinct photoluminescent materials, a greater diversity of colors may be expressed that would otherwise be unachievable through the excitation of a single photoluminescent material. Contemplated colors include light mixtures containing any combination of red, green, and blue light, all of which may be achieved by selecting the appropriate combinations of photoluminescent materials and LEDs. Additional information on the arrangements of distinct photoluminescent materials and corresponding LEDs is disclosed in U.S. patent application Ser. No. 14/697,035 to Salter et al., entitled "LIGHT-PRODUCING ASSEMBLY FOR A VEHICLE," filed Apr. 27, 2015, the entire disclosure of which are incorporated herein by reference.

In operation, the controller 28 may selectively activate the first and second portion of LEDs 42a, 42b by varying the duty cycle and/or current supplied by the power source 52. In this manner, the controller 28 may activate only the first portion of LEDs 42a, only the second portion of LEDs 42b, or both the first and second portion of LEDs 42a, 42b to effectuate a variety of lighting applications. Additionally, the controller 28 may control the intensity of the first and second portion of LEDs 42a, 42b via direct current control or pulse width modulation to ultimately affect the brightness in which the corresponding photoluminescent structure 54, 64 luminesces. For example, with respect to the window assembly 12 shown in FIG. 3, increasing the intensity of the first portion of LEDs 42a generally results in the photoluminescent structure 54 exhibiting a brighter luminescence. Similarly, with respect to the window assembly 12 shown in FIG. 4, increasing the intensity of the first and second portion of LEDs 42a, 42b also generally results in the corresponding photoluminescent structure 54, 64 exhibiting a brighter luminescence. When the light-producing assembly 26 is active, the controller 28 may control the light emission duration of the first and second portion of LEDs 42a, 42b to affect the duration in which the corresponding photoluminescent structure 54, 64 luminesces. For example, the controller 28 may activate the first and second portion of LEDs 42a, 42b for an extended duration such that the corresponding photoluminescent structure 54, 64 exhibits sustained luminescence. Alternatively, the controller 28 may flash the first and second portion of LEDs 42a, 42b at varying time intervals such that the corresponding photoluminescent structure 54, 64 exhibits a blinking effect.

Figure 5:
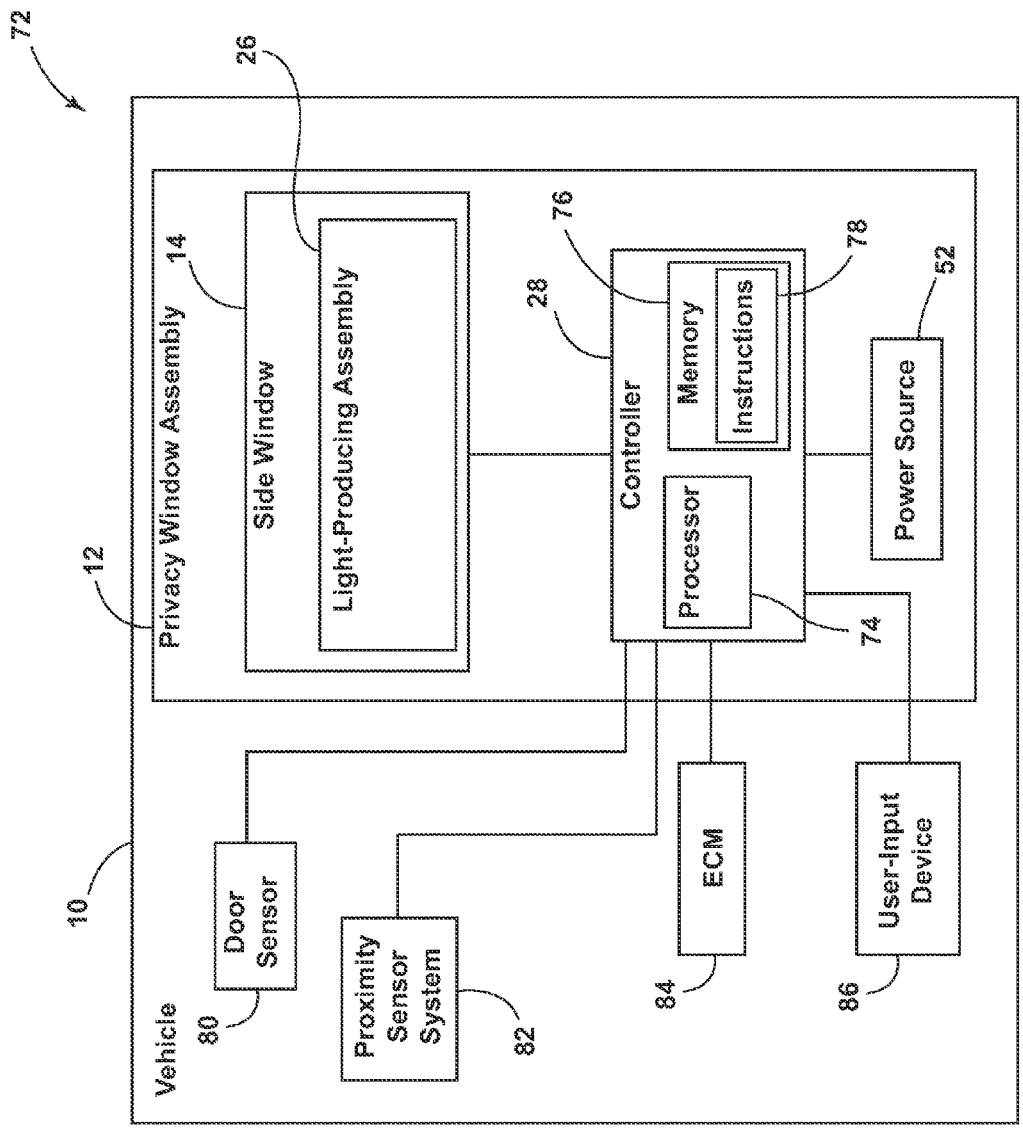
FIG. 5 is a block diagram of a vehicle lighting system employing a window assembly, according to one embodiment.

Referring to FIG. 5, a block diagram of a lighting system 72 is shown according to one embodiment. The lighting system 72 includes at least one window assembly 12 arranged pursuant to that depicted in FIG. 3 or 4. As described herein, the window assembly 12 includes a light-producing assembly 26 coupled to side window 14. The light-producing assembly 26 is electrically connected to a controller 28, which is electrically connected to the power source 52. In one embodiment, the power source 52 may correspond to a vehicular power source operating at 12 to 16 VDC. The controller 28 may be variously located within the vehicle 10 and includes a processor 74 in communication with a memory 76. The memory 76 includes instructions 78 stored thereon that are executable by the processor 74. The instructions 78 enable the controller 28 to selectively operate the light-producing assembly 26 to direct light in an outward-vehicle direction, an inward-vehicle direction (if the door 16 is closed), or both. The controller 28 may be communicatively coupled to one or more vehicle equipment, exemplarily shown as a door sensor 80, proximity sensor system 82, electronic control module (ECM) 84, and user-input device 86 and use signals received therefrom to control the activation state of the light-producing assembly 26.

According to one embodiment, the door sensor 80 is configured to detect a door position of door 16. In instances where the door sensor 80 detects that the door 16 has been opened, the controller 28 may activate the light-producing assembly 26 to illuminate in both directions such the side window 14 illuminates in both directions to warn oncoming vehicles that an occupant is entering or exiting the vehicle 10. In another embodiment, the window assembly 12 may be operated as a privacy window when an object is detected in proximity thereto by the proximity sensor system 82, which may include capacitive sensors, cameras, etc. In response to an object being detected, the controller 28 may activate the light-producing assembly 26 to direct light in an outward-vehicle direction, thereby obscuring the side window 14 from potential onlookers. Additional information on privacy window assemblies and systems is found in U.S. patent application Ser. No. 14/721,274 to Salter et al., entitled "PRIVACY WINDOW ASSEMBLY," filed May 26, 2015 and U.S. patent application Ser. No. 14/744,637 to Salter et al., entitled "PRIVACY WINDOW SYSTEM," filed Jun. 19, 2015, the entire disclosures of which are incorporated herein by reference. It is also contemplated that the controller 28 may control the light-producing assembly 26 to function as a blind spot indicator light when the proximity sensor system 82 detects another vehicle while vehicle 10 is in motion, in which case the controller activates the light-producing assembly 26 to direct light in an inward-vehicle direction to notify occupants of vehicle 10 that a vehicle is in the blind spot. In still another embodiment, the controller 28 may activate the light-producing assembly 26 to direct light in an outward-vehicle direction based on signals received from the ECM 84. For example, the light-producing assembly 26 may be controlled to function as a turn signal, an auxiliary light, a backup light, and the like. In yet another embodiment, the controller 28 may activate the light-producing assembly 26 in response to a request received from the user-input device 86. The user-input device 86 may correspond to a center console touch screen display or a portable electronic device such as a key fob or smart phone.

While the lighting system 72 has been described herein using a single window assembly 12, it should be appreciated that the controller 28 may be similarly coupled to additional window assemblies located on other windows of the vehicle 10 and the controller 28 may control any additional window assemblies in a similar manner to execute the functions described above.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A light-producing assembly comprising:
 a first portion of light emitting diodes (LEDs) biased to direct light in a first direction;
 a second portion of LEDs biased to direct light in a second direction that is different than the first direction, the first and second portions of LEDs being coupled to and occupying a substantial entirety of a vehicle window, wherein the vehicle window is mounted to a door of a vehicle, and wherein the first portion of LEDs is operable to direct light in an outward-vehicle direction and the second portion of LEDs is operable to direct light in an inward-vehicle direction when the door is in a closed position;
 a photoluminescent structure configured to luminesce in response to excitation by light emitted by one of the first and second portions of LEDs; and a controller for selectively activating the first and/or second portions of LEDs based on a vehicle door position, wherein the controller activates the first portion of LEDs to obscure visibility through the vehicle window when the door is in a closed position and an object is detected proximate the vehicle window.

2. The light-producing assembly of claim 1, wherein the controller activates both the first and second portions of LEDs when the door is in an open position.

3. The light-producing assembly of claim 1, wherein the controller activates the second portion of LEDs to function as a blind spot indicator when the vehicle is in motion and another vehicle is detected proximate thereto.

4. The light-producing assembly of claim 1, wherein the controller activates the first portion of LEDs to function as one of a turn signal, an auxiliary light, and a backup light based on signals received from a vehicle electronic control module.

5. The light-producing assembly of claim 1, further comprising an additional photoluminescent structure configured to luminesce in response to excitation by light emitted by the other one of the first and second portions of LEDs.

6. A light-producing assembly comprising:
   a first portion of LEDs biased to direct light in a first direction;
   a second portion of LEDs biased to direct light in a second direction that is different than the first direction, the first and second portions of LEDs being coupled to and occupying a substantial entirety of a vehicle window, wherein the vehicle window is mounted to a door of a vehicle, and wherein the first portion of LEDs is operable to direct light in an outward-vehicle direction and the second portion of LEDs is operable to direct light in an inward-vehicle direction when the door is in a closed position; and
   a controller for selectively activating the first and/or second portions of LEDs based on a vehicle door position, wherein the controller activates the first portion of LEDs to obscure visibility through the vehicle window when the door is in a closed position and an object is detected proximate the vehicle window.

7. The light-producing assembly of claim 6, wherein the controller activates both the first and second portions of LEDs when the door is in an open position.

8. The light-producing assembly of claim 6, wherein the controller activates the second portion of LEDs to function as a blind spot indicator when the vehicle is in motion and another vehicle is detected proximate thereto.

9. The light-producing assembly of claim 6, wherein the controller activates the first portion of LEDs to function as one of a turn signal, an auxiliary light, and a backup light based on signals received from a vehicle electronic control module.

10. A lighting system of a vehicle, comprising:
    a window mounted to a door of the vehicle;
    a door sensor for detecting a door position;
    a proximity sensor system for detecting objects proximate the window; and
    a light-producing assembly coupled to and occupying a substantial entirety of the window and comprising:
       a first portion of LEDs biased to direct light in an outward-vehicle direction;
       a second portion of LEDs biased to direct light in an inward-vehicle direction; and
       a controller for selectively activating the first and/or second portions of LEDs based on the door position, wherein the controller activates the first portion of LEDs to obscure visibility through the window when the door is in a closed position and an object is detected proximate the window.

11. The lighting system of claim 10, wherein the controller activates both the first and second portions of LEDs when the door is in an open position.

12. The lighting system of claim 10, wherein the controller activates the second portion of LEDs to function as a blind spot indicator when the vehicle is in motion and another vehicle is detected proximate thereto.

13. The lighting system of claim 10, wherein the controller activates the first portion of LEDs to function as a turn signal.

14. The lighting system of claim 10, further comprising at least one photoluminescent structure configured to luminesce in response to excitation by light emitted by one of the first and second portion of LEDs.

* * * * *